United States Patent [19]

Kiesel

[11] 4,362,372
[45] Dec. 7, 1982

[54] FOCUSING SYSTEM AND METHOD WITH ADJUSTMENT FOR LENS DEPTH OF FOCUS

[75] Inventor: Kenneth C. Kiesel, Wayland, Mass.

[73] Assignee: Polaroid Corporation, Cambridge, Mass.

[21] Appl. No.: 244,964

[22] Filed: Mar. 18, 1981

Related U.S. Application Data

[63] Continuation of Ser. No. 126,824, Mar. 3, 1980, abandoned.

[51] Int. Cl.³ .............................................. G03B 3/10
[52] U.S. Cl. .................................................. 354/195
[58] Field of Search ................. 354/25, 195, 196, 198; 352/140; 355/56

[56] References Cited

U.S. PATENT DOCUMENTS

| | | | |
|---|---|---|---|
| 3,522,764 | 8/1970 | Biber et al. | 354/195 |
| 3,618,499 | 11/1971 | Harvey | 354/25 X |
| 4,065,778 | 12/1977 | Harvey | 354/25 |
| 4,157,217 | 6/1979 | Isono | 354/25 |
| 4,167,316 | 9/1979 | Johnson et al. | 354/197 |
| 4,199,244 | 4/1980 | Shenk | 354/195 |
| 4,199,246 | 4/1980 | Muggli | 354/195 |

OTHER PUBLICATIONS

"Automatic Focusing by Echo Ranging in SX70 Cameras" by G. Crawley, Brit. Journal of Photography, Apr. 13, 1979.

Primary Examiner—Michael L. Gellner
Attorney, Agent, or Firm—David R. Thornton

[57] ABSTRACT

A focusing system and method for a photographic camera providing an automatic adjustment in the focus setting of the camera lens with aperture size to exploit the increased depth of focus available with a reduction in aperture size. In the illustrated embodiment, the aperture size is determined in accordance with scene light level, and the focus setting of the lens for a given camera/subject distance, as determined by an acoustical range finder, is adjusted automatically one or more positional increments toward the infinity focus setting of the lens to shift the in-focus field of the lens farther from the camera, in response to available subject illumination.

14 Claims, 6 Drawing Figures

FOCUSING SYSTEM AND METHOD WITH ADJUSTMENT FOR LENS DEPTH OF FOCUS

This is a continuation of application Ser. No. 126,824, filed Mar. 3, 1980, now abandoned.

BACKGROUND OF THE INVENTION

This invention relates to focusing systems for photographic cameras and, more particularly, it concerns a focusing system and method by which the variable depth of focus of a camera lens is accounted for automatically in the focus setting of the lens.

Automatic focusing systems for photographic cameras are now well known as evidenced by such commercially available cameras as those marketed by Polaroid Corporation of Cambridge, Mass. under such names as "POLAROID SX-70 SONAR ONE-STEP" and PRONTO ONE-STEP." In such cameras, camera/subject distance is determined by the time required for an acoustical pulse to travel to and from a subject to be photographed. Once the distance or range has been determined, the objective lens of the camera is driven by an electric motor to a focus position corresponding to the acoustically determined range and the film exposure cycle of the camera is carried out. The entire operation of range finding, focusing and exposure occurs in a fraction of a second so that the time required for focusing does not add noticeably to the time normally associated with camera operation for film exposure.

The range finding and lens adjusting functions of such systems are accomplished by electronic circuitry including a focus control pulse counter, a clock oscillator which, when activated, transmits in accordance with subject range, a series of pulses to the counter, and a lens-associated encoder wheel/detector which generates and transmits to the same counter a number of pulses representative of lens focusing movement from a known initial position to the proper focus setting. As camera/subject distance decreases, the number of pulses from the clock oscillator will decrease. Since the lens movement is from the infinity setting to the nearest focus distance setting, the number of pulses resulting from lens focusing movement will increase inversely in relation to camera/subject distance. As a result of this organization of components, lens focusing movement is terminated in response to the focus control counter accumulating a predetermined number of counted pulses.

Also, in cameras of this type manufactured by Polaroid Corporation, a light integrating exposure control system is used to determine automatically the quantity of light permitted to pass to the film during exposure. While like conventional cameras, proper exposure for a given film speed is determined by a combination of aperture size and shutter speed, these two parameters are combined or integrated in a single pair of shutter blades positioned directly behind the objective lens of the camera. When actuated for exposure, these blades move from a closed position through a progressively enlarged aperture setting until they stop and return to a closed position. Auxiliary openings in the same set of blades sweep a light detecting photocell associated with a light integrating network which determines the aperture size to which the shutter blades will move before returning to an exposure terminating or closed position. This type of exposure control is exemplified by the disclosures of U.S. Pat. Nos. 3,641,889, issued Feb. 15, 1972 to Viato K. Eloranta and 3,975,744, issued Aug. 17, 1976, to Bruce K. Johnson, et al.

As in all variable aperture or multi-stop lenses, the distance along the lens axis within which objects will be focused on the camera film plane for a given focus setting of the lens, or depth of focus, will vary with the aperture stop or diameter of the lens opening through which light is passed for film exposure. Specifically, the depth of focus varies inversely with aperture size. In cameras equipped with a light integrating exposure control system of the type mentioned, therefore, depth of focus will vary directly and automatically with the brightness of the scene or object to be photographed.

In acoustical lens focusing systems of the type mentioned, the camera/subject distance is the distance between the camera and the nearest sound reflecting subject portion or object located close to the optical axis of the camera lens. The lens will be focused, therefore, at a position such that the nearest subject portion will lie midway between the near and far limits of the in-focus distance or field provided by the lens depth of focus. While this condition is perhaps representative of the focusing position to which the lens would be set manually by most amateur photographers, in many cases it would be desirable for the medial plane of the in-focus field to be positioned behind the nearest subject so that the near limits of the depth of focus distance falls closely in front of the nearest object while the far limit of the in-focus distance is extended rearwardly. This situation is illustrated by three objects constituting a total subject to be photographed and positioned, for example, at seven, nine and twelve feet from the camera and illuminated by ambient light calling for a lens aperture at which the depth of focus distance is approximately five feet. If the camera lens is focused for approximately seven feet as a result of an acoustical ranger finder distance determination, the first two objects will be in focus whereas the object located twelve feet from the camera will be out of focus. If the focus setting of the lens is increased to nine and one-half feet, all three objects would be in focus as a result of the depth of focus under the ambient light conditions indicated.

SUMMARY OF THE INVENTION

In accordance with the present invention, the focusing adjustment of the camera lens is automatically modified to account for the depth of focus in accordance with aperture size. The lens focusing position, normally determined by the distance between the camera and subject, is shifted through one or more increments of focus adjustment toward the infinity focus setting of the lens, with decreasing aperture size. As a result, the nearest portions of the subject will lie in front of a medial plane of in-focus distance, but within the depth of focus distance extending in front of the medial plane and, correspondingly, those portions of the subject as well as other scene elements positioned behind the nearest subject portion will still be in focus.

The modified lens focusing adjustment of the invention is achieved in automatic lens focusing systems of the type mentioned very simply by preloading the focus control pulse counter of such systems with one or more pulse counts representative of ambient light levels and correspondingly representative of lens aperture setting and lens depth of focus under such ambient lighting conditions. Since lens movement, as mentioned, is from the infinity setting position toward the nearest focus distance setting, the preloaded pulse counts will terminate focusing movement of the lens one or more increments of focus setting toward the infinity setting, again depending on the depth of focus which results from the lens aperture size at which the camera loaded film will be exposed to an image of the subject. Moreover, the counter preloading pulses are developed using the existing light integrating network presently incorporated in commercially available cameras of the type mentioned.

Among the objects of the present invention are, therefore, the provision of an improved method and apparatus for automatically positioning the focus distance setting of a photographic camera lens; the provision of such a method and apparatus which takes advantage of increased depth of focus resulting from reduced lens aperture sizes; and the provision of such a method and apparatus which maximizes use of mechanical and electrical components in presently existing cameras.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIGS. 5a, b and c are schematic illustrations representing various focal setting positions of the camera lens.

DETAILED DESCRIPTION OF THE PREFERRED EMBODIMENT

Figure 1:
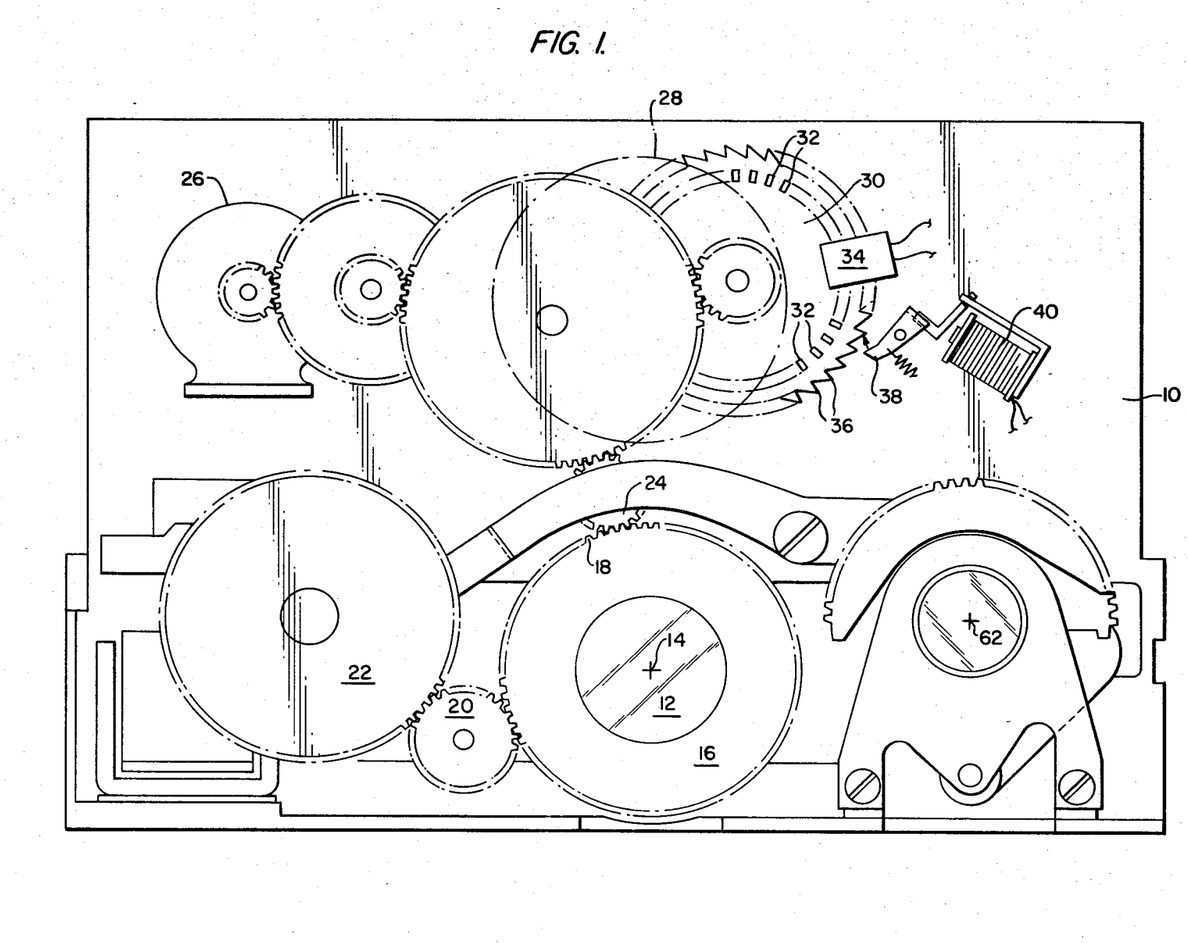
FIG. 1 is a schematic front elevational view of an automatic focusing camera illustrating the mechanical components of its automatic focusing system.

Although the physical characteristics of the present invention are embodied substantially in electronic circuitry to be described with reference to FIG. 6 of the drawings, reference is first made to FIGS. 1-3 which illustrate elementary lens focusing and exposure control components of a camera in which the invention is particularly suited for use. As will be apparent to those skilled in the art from the ensuing description, however, the invention is equally applicable to camera lens focusing and exposure control systems different from that represented in FIGS. 1-3. In FIG. 1, therefore, the shutter and sound module housing of a camera available commercially under the name "POLAROID SX-70 SONAR ONE-STEP" is generally designated by the reference numeral 10. Although many mechanical and electronic components supported by the housing 10 in practice have been omitted from FIG. 1 of the drawings in the interest of more clearly illustrating parts which are relevant to the present invention, it will be noted that a focusing lens element 12 is supported for movement on an optical axis 14 by a rotatable lens mount 16 having peripheral gear teeth 18. The gear teeth 18 mesh through an idler 20 with a manual focusing wheel 22 and also through an idler 24 with a gear train driven by an electric motor 26.

The electric motor 26 and associated gear train are part of an acoustical range finding and automatic focusing system by which the lens 12 is focused in response to the time interval required for an acoustical pulse to be transmitted from and received by a transducer supported by the housing 10 and represented in FIG. 1 by a phantom line circle 28. While the operation of the motor 26 and the transducer 28 to focus the lens 12 will be described in detail with reference to the circuit diagram of FIG. 6, it will be noted at this point that operation of the motor 26 will effect focusing rotation of the lens mount 16 through the gear train illustrated in FIG. 1.

In addition to rotating the lens mount 16, operation of the motor 26 will rotate an encoder wheel 30 supported by the housing 10. The encoder wheel 30 includes a circular array of equally spaced openings 32 located to pass in registry with a photoelectric detector 34 fixed with respect to the housing 10. Although details of the photoelectric detector 34 are not illustrated, it will suffice for purposes of fully understanding the present invention that the detector 34 will generate an electronic pulse once each time an aperture 32 passes the detector 34. Also, the encoder wheel 30 is provided with a series of latch teeth 36 on its periphery, equal in number to the apertures 32 and adapted to be engaged by a pawl 38 energized by a solenoid 40 supported by the housing 10.

Figure 2:
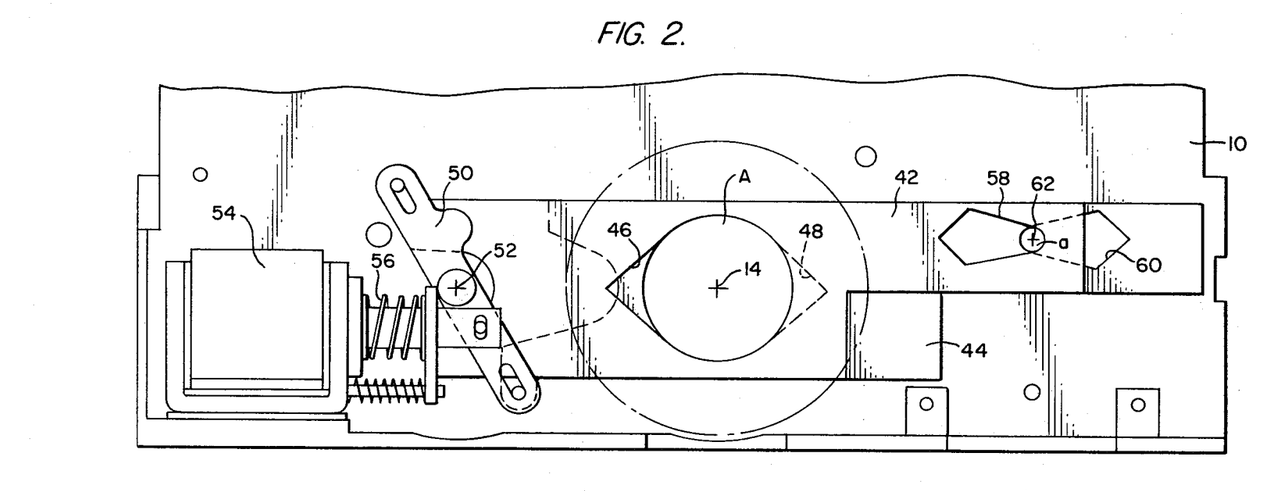
FIG. 2 is a similarly schematic elevation of the exposure control system of the camera of FIG. 1 illustrating a fully open shutter condition.
Figure 3:
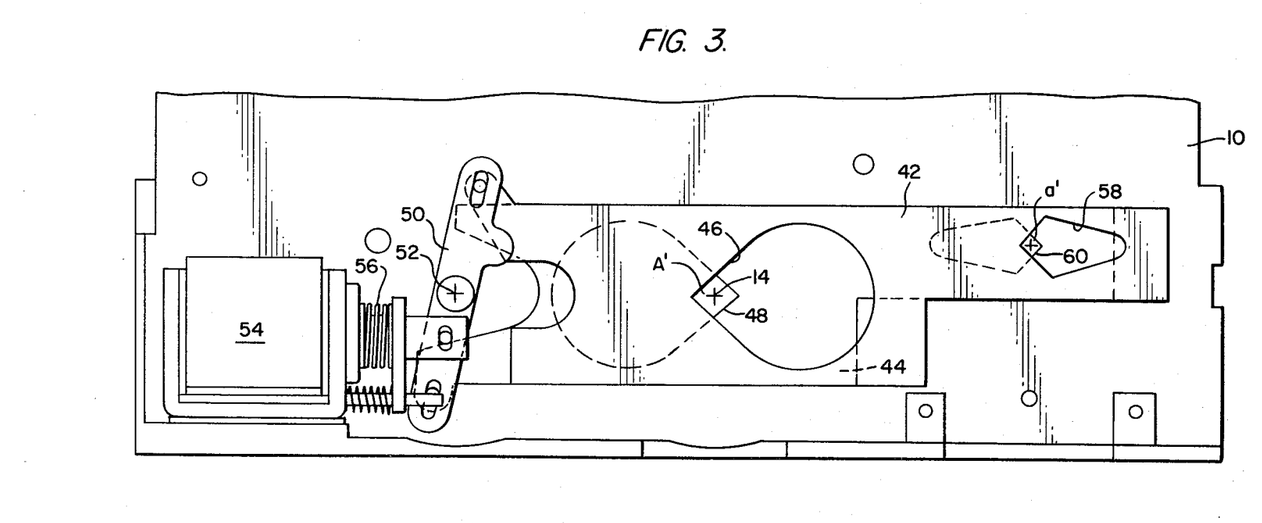
FIG. 3 is a view like that of FIG. 2 with the components of the illustrated exposure control system depicted in an exposure taking position under high scene light conditions.

Exposure control components supported by the housing 10 but behind the lens 12 in the context of light passage from a subject to be photographed to the film plane of the camera including the housing 10, are illustrated in FIGS. 2 and 3 of the drawings. As shown in these drawing figures, a shutter/diaphragm system or scanning shutter is employed, and includes a pair of shutter blades 42 and 44, each having a primary shaped aperture or opening 46 and 48, respectively, are supported for relative lateral sliding movement by the housing 10. The blades 42 and 44 are respectively connected to opposite ends of a walking beam 50 supported by the housing 10 for pivotal movement about a central axis 52 in response to an actuating solenoid 54 having a return spring 56. In addition to the primary openings 46 and 48, the shutter blades 42 and 44 include secondary or photocell sweep openings 58 and 60, respectively. These openings cooperate on an axis 62 which is the axis of a photocell (not shown) supported by the housing 10. Though not shown in FIGS. 1-3, the photocell on the axis 62 forms a part of a light integrating network 120 to be described below with reference to the circuit diagram illustrated in FIG. 6.

The operation of the exposure control system illustrated in FIGS. 2 and 3 of the drawings is now well known and described in several prior patents including, for example, U.S. Pat. Nos. 3,641,889 and 3,975,744 cited above. A full appreciation of the present invention will be facilitated, however, by summarizing at least certain aspects of the exposure control operation effected by the structure shown in FIGS. 2 and 3.

Because of the generally tear-shaped configuration of the shutter blade openings 46 and 48, a maximum exposure value or primary aperture value A is provided behind the lens 12 when the shutter blades 42 and 44 are in the fully open position as shown in FIG. 2 of the drawings. In this condition, the solenoid 54 is de-energized and the walking beam 50 is urged to the position shown by the spring 56. Also, it will be noted that the sweep openings 58 and 60 define a secondary opening or aperture a through which light may pass on the axis 62 to the light sensing element (not shown) of the light integrating network 120. As is explained in the aforementioned U.S. patents and as, in fact, occurs in the aforementioned commercially available camera, the fully opened position of the shutter blades is both the initial shutter condition which permits reflex viewing of a scene, and also provides the maximum aperture value achieved under low light conditions.

Upon actuation of the exposure control system illustrated in FIGS. 2 and 3, the solenoid 54 is energized to move the blades 42 and 44 to a position in which both apertures A and a are fully closed. Film exposure then commences by deenergizing the solenoid so that the spring 56 will move the blades 42 and 44 to define enlarging aperture values and, for example, under high scene light conditions only reach a position in which the openings 46 and 48 define an exposure aperture value A'. Simultaneously, the sweep openings 58 and 60 will define enlarging secondary aperture values ultimately reaching an aperture a'. When the sum total of light passing the secondary aperture value is appropriate for proper exposure of the film by light passing the exposure aperture, the solenoid 54 is again energized to quickly close both apertures; following which the now exposed film is covered within the camera by a reflex mirror (not shown), whereupon the blades are returned to their full open position as shown in FIG. 2 for viewing of the next scene.

The significance of the aforementioned exposure control operation is that although shutter speed and lens aperture size are integrated, the configuration of the openings 46 and 48 provide a variable lens aperture depending on illumination passing from the scene to be photographed or on ambient scene light in the absence of some flash illumination. Also, and as is well known in the photographic art, the size of the lens aperture is determinative of the lens depth of focus or the distance fore and aft of a given focus distance setting of the lens within which all subject matter will be in focus at the film plane of the camera. Specifically, for a given lens the depth of focus will be minimal with a large aperture represented, for example, by the fully opened condition of the shutter blades 42 and 44 in FIG. 2 of the drawings. On the other hand, with a relatively small aperture such as that represented by A' in FIG. 3, the lens depth of focus will be significantly increased.

Figures 4, 5:
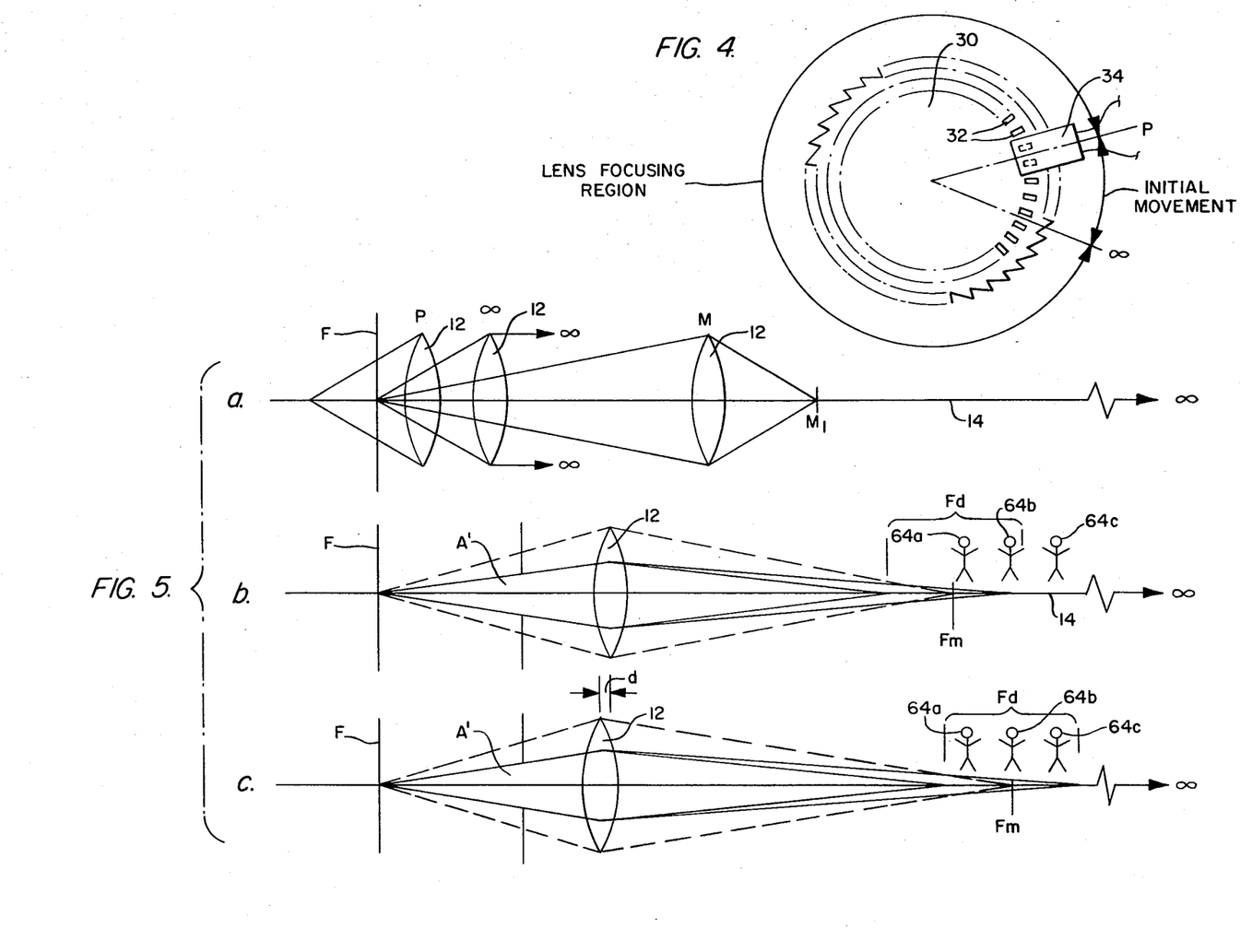
FIG. 4 is a front elevation view illustrating an encoder wheel component of the automatic focusing system of FIG. 1.

In FIG. 5 of the drawings, various focus settings of the lens 12 along the axis 14 thereof are depicted schematically in relation to the film plane F of the camera in which the lens 12 is mounted. In FIGS. 5b and 5c, the depth of focus distance $F_d$ for a given size lens aperture A' is also illustrated in relation to a subject S, represented by three objects 64a, 64b and 64c, located in a photographic scene at different distances from the lens 12. Thus in FIG. 5b, the lens 12 is adjusted along the axis 14 to the conventional focus position where the first object 64a lies at or near a medial plane of focus $F_m$, and the depth of focus $F_d$ for the aperture A' straddles the plane $F_m$ so that two of the objects 64a and 64b will be in focus as well as a distance of foreground in front of the first object 64a. The farthest object 64c, however, will not be in focus in this condition. However, if the setting of the lens 12 is adjusted through a distance d from the film plane F as shown in FIG. 5c such that the subject distance to which the lens 12 is focused is shifted toward infinity, the medial plane of focus $F_m$ is also thereby shifted so that all three objects 64a-c lie in the depth of focus distance $F_d$. The present invention is addressed to the shifting of the focus position of the lens 12 in a manner represented by FIG. 5c, and an understanding of the method and apparatus by which this result is obtained may be had by reference to FIG. 6 of the drawings.

Figure 6:
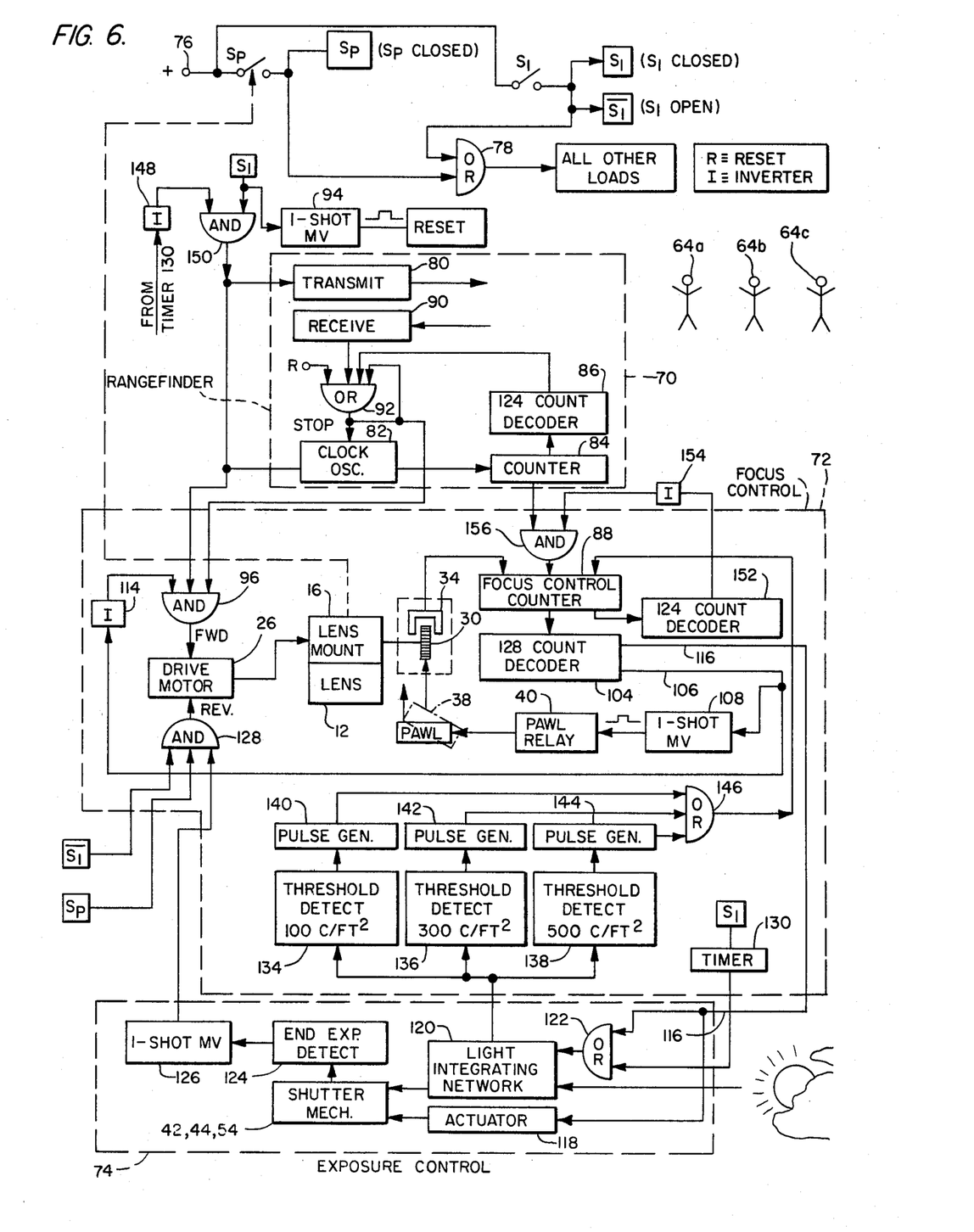
FIG. 6 is a schematic circuit diagram of electronic components in the automatic focusing system of the present invention.

Prior to describing the present improvement in detail, the operation of the prior camera system will be briefly reviewed with respect to FIG. 6, which illustrates a schematic diagram of an automatic focus control system incorporating the present invention, and shown to include generally, a range finder 70 (e.g., a sonic range finder), a focus control segment 72 and an exposure control segment 74, each of which is represented by a dashed line enclosure in the illustrated diagram. A source of electrical power (not shown) is supplied to one terminal of a spring force biased, manually actuated, single pole switch $S_1$ and to one terminal of a lens movement actuated single pole switch $S_p$ through a terminal 76. Upon actuation of the switch $S_1$ to a closed condition, a signal $S_1$ will appear at the output of the switch. When the switch $S_1$ is opened, a signal $\overline{S_1}$ will appear at the output thereof. A signal $S_p$ will appear at the output of the switch $S_p$ when this latter switch is closed. It will be noted further that in addition to the control or logic signals provided by the switches $S_1$ and $S_p$, these switches can also be used to disconnect all loads from the power source connected with the terminal 76. Thus, the outputs of both switches $S_1$ and $S_p$ are also fed to an OR gate 78 and then to as many electrical loads as desired. Also, it is to be understood that when the switch $S_1$ is eventually opened, power continues to be supplied through the lens movement actuated switch $S_p$. When the switch $S_p$ is returned to its initial opened condition, however, all electrical loads receiving power from the terminal 12 are disconnected.

In the prior commercially available camera (unlike the circuitry illustrated in FIG. 6 as later explained in detail), the range finder 70 operation is, in essence, the first camera operation. Thus, in that application, closure of the switch $S_1$ energizes an acoustical transmitter 80 and a clock oscillator 82 simultaneously. When energized, the transmitter 80 causes an acoustical burst of energy to be transmitted toward the subject 64. Simultaneously, the clock oscillator 82 starts to generate a series of time related pulses. A counter 84 counts the pulses being generated by the clock oscillator 82 and transmits these pulses to a decoder 86 and to a focus control counter 88. Preferably, the clock counter system is scaled in steps to match the linear range parameter to the nonlinear lens focal position curve.

When an acoustical signal is reflected back to the range finder from the nearest subject 64 in the acoustical path, a signal is generated by a receiver 90 and transmitted to the clock oscillator 82 through a latching OR gate 92 to stop the clock oscillator 92 at a point where the number of pulses generated by the clock oscillator 82 are representative of the total time taken for the acoustical burst of energy initially transmitted by the transmitter 80 to return to the receiver 90. As indicated above, the transmitting and receiving functions are served by the same transducer 28, the transmitter 80 and receiver 90 being electrical components associated with the transducer 28 in practice. If the time required for the acoustical pulse to travel from the range finder 90 to the subject 64 and back to the range finder is such that the clock oscillator 82 generates 124 pulses, the decoder 86 will send a signal to the clock oscillator through the latching OR gate 92 to stop the clock oscillator at 124 pulses. In other words, the clock oscillator 82 is limited to 124 pulses by the decoder 86 on the basis that the time required for generation of 124 pulses, given the speed of sound, represents a subject distance at which the focusing lens element 12 is at its infinity focus position. Thus, an object located beyond that position and which would otherwise result in the clock oscillator 82 generating more than 124 pulses, is assumed to be in focus.

Because the gate 92 is a latching OR gate, if a normal input to the gate 92 is removed, the output from the gate 92 caused by such an input will be maintained. Thus, the output from the gate 92 is removed only when the gate is reset by a pulse generated, for example, by a one-shot multivibrator 94 which, in both the existing commercial camera and in the embodiment shown in FIG. 6, is energized when the switch S$_1$ is actuated to its closed position.

From the foregoing, it can be seen that the range finder 70 provides ranging means which generates a range signal (the time between transmit and receive of the sonic signal) indicative of subject distance, and through the scaled clock 82 ultimately provides a series of pulse counts (accumulated by counter 84) whose number is representative of the lens position or lens setting at which a subject at that distance will be in focus. Hence, the range finder 70 has a lens focus setting corresponding to subject distance range.

In the illustrated system, focusing movement of the lens 12 by the focus control portion 72 of the system is not initiated until the camera/subject distance has been first determined by the range finder 70. This determination is made when an output appears at the latching OR gate 92. In particular, the signal from the output of the latching OR gate is combined with a signal S$_1$ from the closed switch S$_1$ at an AND gate 96 which will conduct and transmit a drive forward signal to a lens drive motor 26. The motor 26 will drive the lens mount through the gear train described above with respect to FIG. 1, causing axial movement of the focusing lens element 12 and rotation of the encoder wheel 30. Because the wheel 30 is coupled through the gear train with the lens mount 16, the angular or rotational position of the encoder wheel is representative of the rotary position of the lens mount and also of the axial focusing position of the lens 12.

As previously mentioned, the detector 34 is operative to generate a pulse each time an aperture 32 in the encoder wheel 30 passes the center of the detector 34. Thus, as the motor 26 is operated to drive the lens mount 16 and the encoder wheel 30, the detector 34 will generate pulses that are representative of lens mount movement. The pulses from the detector 34 are transmitted to and are counted by a focus control counter 88. When the number of pulses generated by the clock oscillator 82 and the detector 34 reach a combined total of 128 in the counter 88, a decoder 104 generates an output signal 106 indicating that focusing movement of the lens 12 has been completed. The focus complete signal 106 causes a one-shot multivibrator 108 to momentarily energize the solenoid 40 causing the pawl 38 to engage the encoder wheel 30 and thus stop motion of the encoder wheel, the gear train associated therewith and the lens 12. Simultaneously therewith, a focusing complete signal 106 is inverted by an inverter 114 causing the AND gate 96 to open, thereby shutting off the drive forward signal to the motor 26. At this point, an image of the object 64 has been focused at an image plane for viewing and film exposure through the focus lens 12. Hence, the focus control in the prior camera as described provides means for automatically driving or adjusting the lens to the setting defined by the range finder 70.

In addition to the focus complete signal 106, the decoder 104 simultaneously generates an exposure initiate signal 116 which is transmitted to an exposure control actuator 118. The exposure initiate signal 116 is also transmitted to a light integrating network 120 through an OR gate 122. The output of the actuator 118 and of the light integrating network are transmitted to the shutter mechanism which in this instance may be assumed to include the shutter blades 42 and 44 as well as the shutter blade actuating solenoid 54 described above with reference to FIGS. 2 and 3. Termination of shutter mechanism actuation is detected by an end of exposure detector 124 which actuates a one-shot multivibrator 126, the output of which is transmitted to an AND gate 128 in the focus control segment 72.

As indicated, when the switch S$_1$ is opened, it generates a signal $\overline{S_1}$ and transmits such signal to the AND gate 128 in the focus control segment 72 where it is combined with the signal S$_p$ and the output of the one-shot multivibrator 126, thereby causing the AND gate 128 to transmit a reverse drive signal to the motor 26. The motor 26 will then drive the lens mount 16 and the movable lens element 12 in an opposite direction to which it was driven during focusing. The signal S$_p$ is generated when the switch S$_p$ is actuated to the closed position. The switch S$_p$ is retained in its closed position so long as the lens 12 is in any of several in-focus positions to be described in more detail below. Conversely, the switch S$_p$ is actuated to its open position upon movement of the lens mount 16 and the lens 12 to a parking position also to be described.

As mentioned above, the decoder 104 signals both completion of focusing and initiation of exposure when the total number of pulses accumulated in the focus control counter 88 reaches 128. Where this total count in the focus control counter 88 is the sum only of pulses generated by the counter 84 and by the detector 34, and where the clock oscillator 82 generates 124 pulses to indicate a lens setting at infinity, it will be appreciated that the detector 34 must generate at least four pulses before focusing is complete. The reason for this is that the lens 12 and lens mount 16 are positioned originally in a park position P as shown in FIGS. 4 and 5a of the drawings. In other words, in the park position P, the lens 12 will not focus any subject on the film plane F of the camera. To reach the infinity setting position from the park position P, the lens 12 must be rotated and advanced axially from the park position through an initial movement which, as indicated in FIG. 4, causes movement of the encoder wheel so that at least four apertures 32 pass the detector 34. Thus, it will be appreciated that the lens will be properly positioned in the infinity position when the range finder 70 develops 124 pulses and the detector 34 transmits four additional pulses in the focus control counter 88. Should the clock oscillator 82 generate a number of pulses lower than 124, thus indicating a camera/subject distance requiring a lens setting of less than infinity, the lens mount 16 and the encoder wheel 30 will be rotated by the motor 26 until the appropriate number of apertures 32 pass the detector 34 to generate a number of pulses equal in number to the difference between 128 and the number of pulses counted by the range finder counter 84.

The preceding description represents essentially a summary of the exposure control and automatic focusing system of cameras presently commercially available under the name "POLAROID SX-70 SONAR ONE STEP." In accordance with the present invention, the existing system is modified to effect a focusing adjustment of the lens 12 in accordance with subject illumination or, that is, exposure aperture value so that maximum advantage may be taken of the depth of focus $F_d$ available for a given lens aperture A'. Operation in this manner is achieved in the overall range finding and exposure cycle described above by preloading the focus control counter 88 with one, two or three pulses depending on the level of ambient light in which the subject 64 to be photographed is illuminated. As a result of this preloading of the counter 88, the number of pulses which will be generated by the detector 34 during movement of the encoder wheel 30 and the lens 12 in passing from the infinity focus position will be reduced, thus positioning the lens 12 one, two or three focus increments toward the infinity position from that in which it otherwise would be positioned.

Specifically, and again with reference to FIG. 6 of the drawings, it will be noted that closure of the switch $S_1$ to generate the signal $S_1$ energizes a timer 130 (illustrated within the focus control segment 72) whose output is transmitted to and energizes the light integrating network 120 of the exposure control segment 74 for a finite, short period of time on the order of microseconds of duration. It will be recalled that the secondary aperture a established by the sweep openings 58 and 60 of the shutter blades 42 and 44 (FIGS. 2 and 3) is initially fully open at this time to pass light along the axis 62 to a photocell (not shown) associated with the light integrating network 120. Thus, the light integrating network, which will later be employed in the conventional manner to determine the exposure interval (which also determines the effective aperture value) is also employed for a pre-evaluation of scene light level and, in turn, provides means for signalling or indicating the effective aperture value.

The output of the light integrating network, when energized only by the timer 130 through the OR gate 122, is transmitted to a plurality of detectors, specifically three threshold detectors 134, 136 and 138 in the focus control segment 72, whose outputs feed respectively to single-shot pulse generators 140, 142 and 144 and to an OR gate 146. The output of the OR gate 146, if any, is transmitted directly to the focus control counter 88. Because the output of the light integrating network 120 is time integrated, the cumulative output for a given time interval will be representative only of the intensity of light passing the opening a. Also, by staging the three detectors 134, 136 and 138 to detect successive threshold levels in the output of the network 120, an input will be transmitted in sequence to the three pulse generators 140, 142 and 144, assuming that the photocell (not shown) associated with the network 120 is exposed through the opening a to high ambient light intensity. Thus, in the illustrated embodiment, the threshold detector 134 will develop a signal and from pulse generator 140, generate a pulse at the OR gate 146 when the output of the light integrating network reaches a threshold corresponding to an illumination level of 100 c/ft.$^2$ (representative of an anticipated effective aperture of f/10.8); the threshold detector 136 will cause a pulse to be developed by the pulse generator 142 upon the output of the light integrating network 120 reaching a threshold the equivalent of 300 c/ft.$^2$ (an effective aperture of f/14.9); and the threshold detector 138 will result in a signal from the pulse generator 144 when the output of the light integrating network 120 represents an illumination level or threshold of 800 c/ft.$^2$ (an effective aperture of f/19.2). With lower levels of ambient light intensity, zero, one, or two pulses may be developed at OR gate 146 by the output of the network 120 reaching thresholds of only detectors 134 or 136 before the output of the timer is terminated to turn off and reset the light integrating network 120.

Hence, it can be seen that the light integrating network 120, the detectors 134, 136, 138 and their respective pulse generators 140, 142 and 144 provide an aperture determining means and, in cooperation with the count accumulator, focus control counter 88 provides means for altering the distance related, lens position selection inversely with aperture size. Consequently, the focus control 72 provides means for adjusting the lens responsive to both the range finder and the aperture determining means.

In order that the pulses from the OR gate 146 are counted by the focus control counter 88 before signals are transmitted from the range finding counter 84, the output of the timer 130 is also transmitted to the range finder 70 through an inverter 148 to an AND gate 150. Since the signal $S_1$ is also an input to the AND gate 150, operation of the transmitter 80 and of the clock oscillator 82 as described above will not proceed until operation of the timer 130 has ceased.

It will be recalled also that when the total number of pulses transmitted to the focus control counter 88 reaches 128, the focusing operation is completed and the exposure control system is actuated to initiate film exposure. Also, it will be recalled that where a subject is sufficiently remote from the camera that the lens 12 should be set at infinity, four pulses must be generated by the encoder wheel detector 34 to reach the infinity setting of the lens 12. It will be appreciated also that if the counter 88 has received a total of 124 pulses from the range finding counter 84 and the counter 88 has also been preloaded with one, two or three counts from the OR gate 146, the lens 12 will not reach the infinity position from its park position P and also will not focus any subject on the film plane F. To prevent this unwanted situation from occurring, the output of the focus control counter 88 is transmitted to an additional 124 count decoder 152 which develops an output signal when the total count in the focus control counter 88 reaches 124. The output of the decoder 152 is transmitted through an inverter 154 to an AND gate 156, the other input of which is from the range finding counter 84. The net effect of this arrangement is that the total number of pulses from the combination of the counter 84 and the OR gate 146 may not exceed 124. As a result, the effect of the pulses from the OR gate 146 will be cancelled when the range finder 70 determines an infinity lens focus position and the counter 88 will always receive at least four pulses from the detector 34 before an output is generated by the decoder 104.

In light of the foregoing, the manner in which the present invention may be advantageously used in practice may be understood with reference again to FIGS. 5b and 5c of the drawings. Thus, in FIG. 5b, if it is assumed that the ambient light in which the three objects 64a-c is 100 c/ft.² and that the objects are positioned at different distances from the lens 12 as shown, but spaced from each other by distance equal to the depth of focus distance $F_d$ for an exposure aperture value A' in such illumination, the lens 12 would be ordinarily positioned to focus on the first object 64a as a result of the acoustical pulse being reflected from that first object. The result is that only the first two objects 64a and 64b would be included in the depth of focus distance $F_d$ whereas the farthest object 64c would be out of that distance and correspondingly not in clear focus.

In FIG. 5c, the effect of the present invention is illustrated. Specifically, the ambient light level of 100 c/ft.² would preload the focus control counter 88 with one pulse. After the number of pulses representing the range of the nearest subject 64a have been transmitted from the counter 84 to the counter 88, the latter will include one count more than that produced by the range finder. The motor 26 then operates to drive the lens mount 16 and lens 12 from its park position P past the infinity setting position and toward a position represented by a total pulse count of 128 in the counter 88. Focusing movement of the lens, however, will terminate short of that position by the distance represented by one count or, that is, by one aperture 32 in the encoder wheel 30. The lens 12, therefore, will stop one step toward its infinity focus position such that the medial plane of focus $F_m$ is at subject 64b. As a result, the depth of focus distance $F_d$ will bracket all three of the objects 64a, 64b and 64c under the ambient light illumination given.

With higher levels of ambient light, and correspondingly, with a further reduced size of the lens aperture A', the depth of focus distance $F_d$ will be increased. Because the near and far limits of the depth of focus distance extend equally in front of and behind a medial plane represented by the focus setting of the lens 12, the final position to which the lens 12 is automatically adjusted will be advanced even further by one or two additional increments of focus positioning.

The present system in effect adds pulses to an accumulator or focus control counter to shift the lens setting accordingly, and lens movement operates to fill this counter. However, the additional counts generated in accordance with decreasing aperture size could be employed in a variety of pulse ranging systems to alter the final lens setting and may also be effectively employed in some applications as counts increasing with aperture size.

From the foregoing it will be appreciated that the present invention represents an extremely economical modification to existing camera structure and circuitry which provides a highly effective focusing adjustment in an automatic lens focusing system. While the present invention has been described with respect to an automatic focusing camera and a scanning shutter exposure system, it should be realized that the invention has application to a variety of ranging and focusing arrangements, and to any exposure system in which the size of the taking aperture can be predicted or determined prior to final movement of the lens. Consequently, while the invention has been described in the context of the specific camera organization illustrated in the drawings, it will be appreciated by those skilled in the art that it may be adapted to other types of automatic focusing systems and that it may be modified without departure from the concepts manifested by the illustrated embodiment. Accordingly, it is expressly intended that the foregoing description is illustrative of a preferred embodiment only, not limiting, and that the true spirit and scope of the present invention be determined by reference to the appended claims.

What is claimed is:

1. The method of focusing a variable aperture objective lens of a photographic camera having a range finder to determine the distance from the camera to the near part of a subject to be photographed, focus control means for positioning said lens at a focus setting corresponding to the distance determined by said range finder and aperture control means for determining the effective lens aperture value for proper exposure of camera-contained film to said subject, said method comprising the steps of:
    generating a signal representative of objective lens depth of focus for the determined lens aperture value to be used; and
    transmitting said signal to said focus control means to effect a focusing adjustment of said lens in accordance wth said determined aperture value to a focus setting corresponding to a distance greater than that determined by said range finder.

2. The method recited in claim 1 wherein said aperture control means is responsive to the light level of the scene for determining the effective aperture, and said step of generating a signal is in correspondence with said light level.

3. The method recited in claim 1 or 2 comprising the further step of cancelling the effect of said signal when the distance determined by said range finder requires a focus setting of said lens corresponding to an infinite camera/subject distance.

4. The method recited in claim 1 or 2 wherein the focus control means of the camera includes focus means for providing a predetermined pulse count representative of camera/subject distance, pulse counting means for accumulating said pulse count lens movement to a focus setting in a direction proceeding from the infinity focus setting thereof to the near distance focus setting thereof, and said signal generating step includes providing one or more pulses in correspondence with said effective aperture value, and said transmitting step includes the step of loading said pulse counting means with said one or more pulse counts provided by said signal generating step.

5. The method recited in claim 4 wherein said generating step includes providing an additional pulse for successive levels of scene light intensity.

6. In an automatic focusing system for a photographic camera, said camera having a variable lens aperture, means for determining the effective value of said lens aperture employed in a given photographic scene, range finder means for determining camera/subject distance, and focus control means for positioning a lens element of said camera within a range of focus distance settings, the improvement comprising:
    means for generating a signal representative of the size of said lens aperture and correspondingly, the lens depth of focus; and
    means for adjusting said focus control system to position said lens element in response to both said range finding means and said aperture determining means to a focus distance setting corresponding to a camera/subject distance greater than the distance determined by said range finder so as to exploit the depth of focus variation with selected aperture value.

7. The apparatus recited in claim 6 wherein the means for determining the effective value of the lens aperture comprises light responsive means, and means for determining said effective aperture value in accordance with said light responsive means, and further including means for controlling said signal generating means in accordance with light levels of subject illumination determined by said light responsive means.

8. The apparatus recited in either of claims 6 or 7, wherein the focus control means includes means for providing a predetermined pulse count representative of camera/subject distance, counting means for accumulating said predetermined pulse count, and means for moving said lens element to a focus setting in a direction proceeding from the infinity focus setting thereof to the near distance focus setting thereof, and said adjusting means includes means responsive to said signal generating means for transmitting, in addition to said predetermined pulse count, one or more pulses to said counting means depending on the value of the lens aperture and resulting depth of focus.

9. The apparatus recited in claim 8, comprising means to energize said signal generating means and said pulse transmitting means prior to energization of the range finder means.

10. In a photographic camera comprising an automatic exposure and focus control system having a shutter mechanism, means including a light integrating network for controlling the shutter mechanism to establish a lens aperture variable automatically with light levels illuminating a scene to be photographed, an objective lens having a lens element movable through a range of focus distance settings, a range finder means for generating a series of range pulses corresponding in number to camera/subject distance, focus control means including a lens movement detector for generating another series of lens pulses corresponding in number to focusing movement of said lens element in a direction from an infinity focus setting to a near distance focus setting, counter means for accumulating the total count of both said series of pulses and encoding means for fixing the focus setting of said lens element in response to a predetermined total count in said counter means, the improvement comprising:

means for transmitting to said counter means one or more additional pulses corresponding in number to successively increased light levels of subject illumination whereby said lens element will be positioned by said focus control means at a focus setting corresponding to a camera/subject distance greater than the distance represented by the number of pulses generated by said range finder means.

11. The apparatus recited in claim 10, wherein said additional pulse transmitting means comprises: means for energizing said light integrating network for a time interval of predetermined duration; means for detecting at least one predetermined output threshold of said network reached during said time interval; and means for generating at least one of said additional pulses upon detection of said output threshold.

12. The apparatus recited in claim 11, wherein said output threshold detecting means comprises two or more threshold detectors for detecting successively higher output thresholds of said network as may occur during said time interval.

13. The apparatus recited in either of claims 11 or 12, including means for delaying at least completion of said automatic focusing operation until the completion of said time interval.

14. The apparatus recited in either of claims 10, 11 or 12, including means for limiting the number of pulses transmitted to said counter to said predetermined count, thereby to cancel the effect of said additional pulses when the series of pulses generated by said range finder correspond to an infinity setting of said lens element.

* * * * *